PAUL V. OSBORN, JR
INVENTOR.

BY E. J. Berry

PAUL V. OSBORN, Jr.
INVENTOR.

BY E. J. Berry

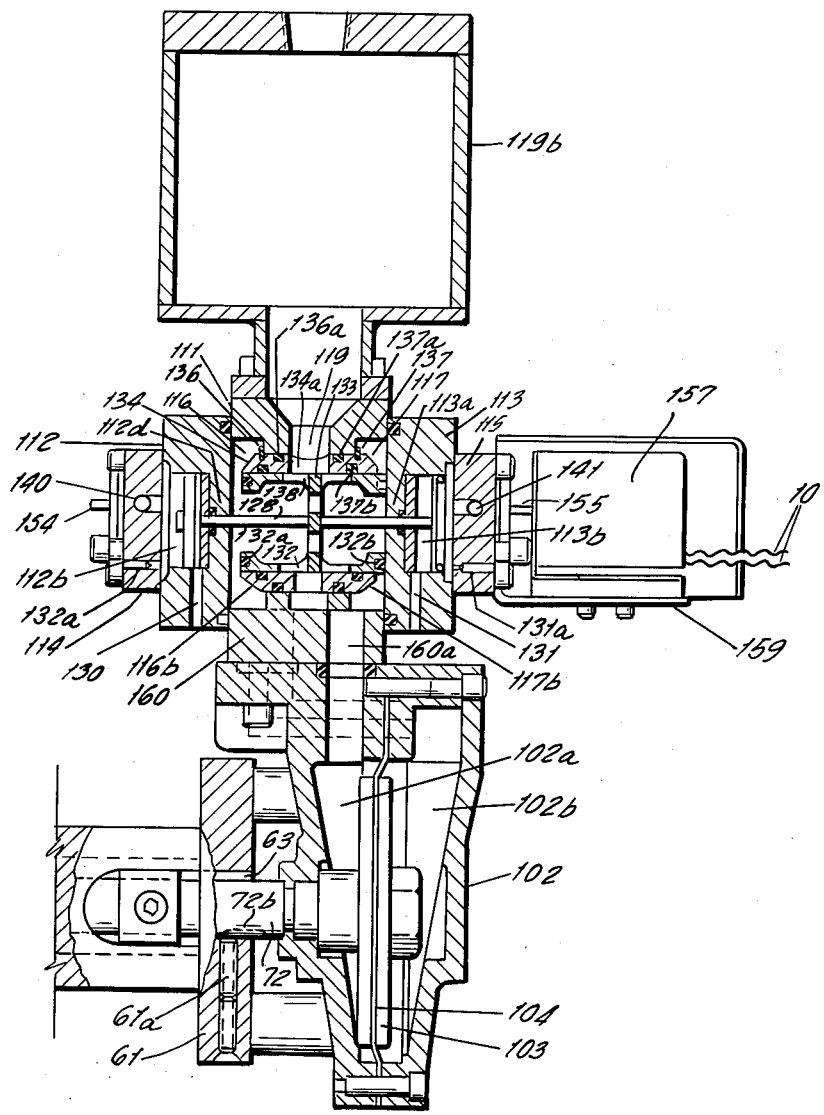

PAUL V. OSBORN, Jr.
INVENTOR.

Nov. 9, 1965   P. V. OSBORN, JR   3,216,297
SHEET CUTTING AND STACKING APPARATUS
Filed Nov. 22, 1961   6 Sheets-Sheet 5

PAUL V. OSBORN, Jr.
INVENTOR.

BY E. J. Berry

PAUL V. OSBORN, Jr.
INVENTOR.

BY E. J. Berry

United States Patent Office 3,216,297
Patented Nov. 9, 1965

3,216,297
SHEET CUTTING AND STACKING APPARATUS
Paul V. Osborn, Jr., Rochester, N.Y., assignor to National Distillers and Chemical Corporation, New York, N.Y., a corporation of Virginia
Filed Nov. 22, 1961, Ser. No. 154,162
1 Claim. (Cl. 83—92)

The present invention relates to an apparatus for stacking individual cut sections of a pliable material as successively produced from a substantially continuous sheet or web of said material. The invention relates especially to an apparatus for stacking a continuous series of bags produced from a substantially continuous web of flattened, tubular, thermoplastic material, and as delivered from a cutting and sealing device. The invention further relates to stacker apparatus which includes a component adapted for intermittent actuation of a stacker foot. In particular, the invention relates to such a component having the generic characteristics of a single revolution clutch.

In the prior art, intermittent clutch structures have been employed in punch presses as used for perforating, shearing, forming and trimming metals, prestacked fibrous materials, papers, and the like. Many of these employ mechanical means for initiating and interrupting the punch motion. Others have employed, braking means intermittently applied to a driven element, while permitting slippage between the driven and driving elements. At high operating speeds, however, such as might require intermittent engagement of the clutch face with a surface rotated at speeds above 150 r.p.m., and to 600 r.p.m. or above, with the conventional single revolution clutch, serious problems are encountered.

At higher speeds, mechanical elements such as the dogs previously employed would engender severe conditions of stress not only in the elements making contact, but also in all parts directly or indirectly subjected to the shock entailed by a sudden and abrupt stoppage. Likewise, at such speeds, the conventional structure in which slippage is tolerated between the driven and driving members develops serious problems as a result of high temperatures and excessive wear due to frictional contact of the moving parts. In addition, the conventional apparatus loses effectiveness and stopping precision at the higher speeds.

It is an object of the present invention to provide a stacking apparatus wherein cut sheets or bags, as formed at rates in excess of about 200 feet of web travel per minute, may be stacked with an accuracy of one half inch edge variation. It is also an object of the present invention to provide stacking apparatus wherein the stacking operation is accomplished by means of a stacker foot mounted on and actuated by a single revolution plate operable with such accuracy at driving speeds in excess of 600 revolutions per minute. A further object of the invention is to provide a clutch structure of the character contemplated wherein the mass of the driven members with relation to that of the driving members is reduced to an extent such as most effectively to minimize the effect of inertia in the driven member and permit activation and deactivation of the driven member within about 35 to 40 degrees of rotation or less, at rotational speeds of 600 revolutions per minute, or above, in the driving member.

The present invention and its objects may be more fully understood from the following description when it is read with reference to the accompanying drawings in which:

FIGURES 2A and 2B are vertical sections longitudinally through the single revolution clutch assembly and sub-assembly taken substantially along the line II—II of FIGURES 1 and 5, with parts in elevational;

Figure 1:
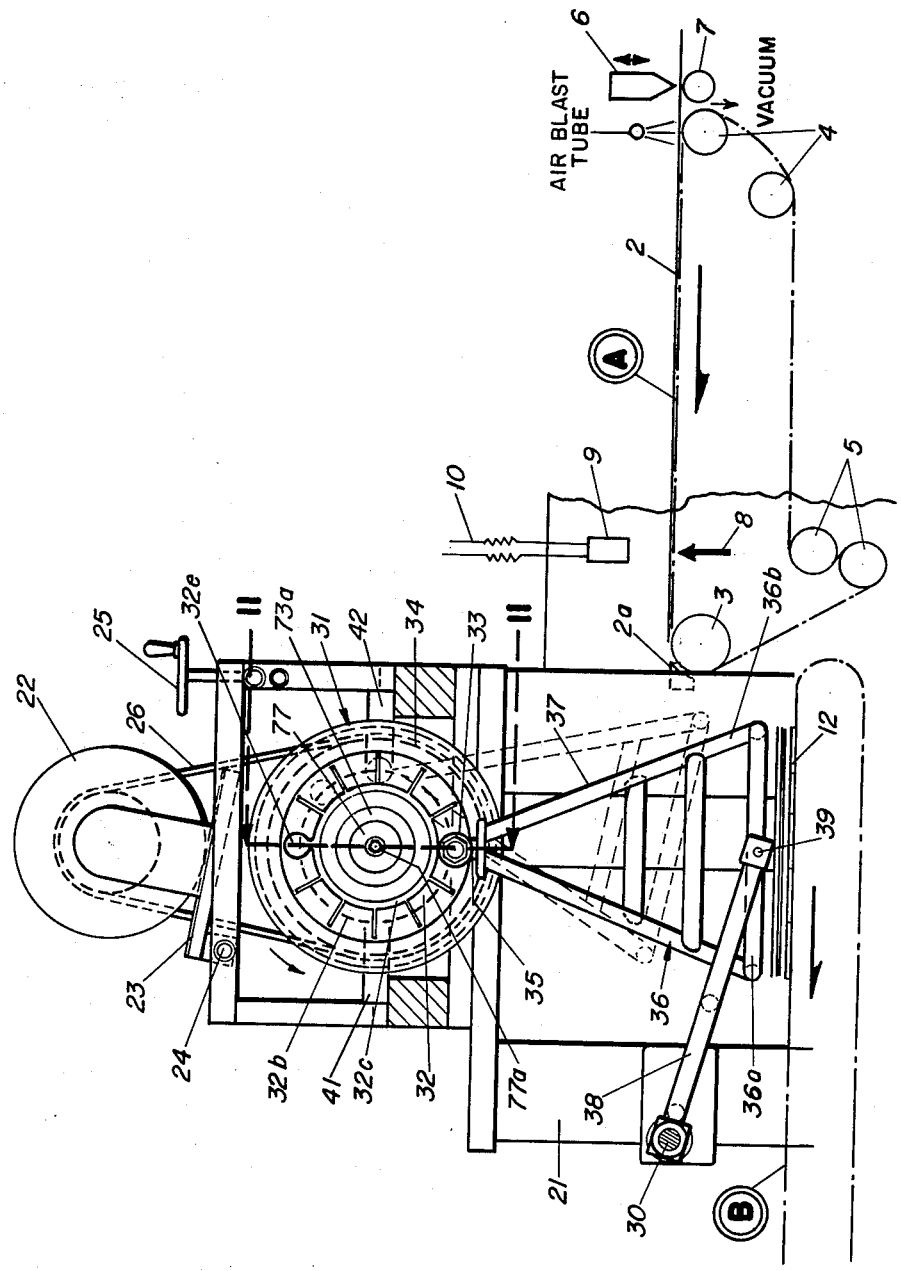
FIGURE 1 is a semi-diagrammatic showing of a sheet unit forming and stacking apparatus of the character contemplated in side elevation with the single revolution clutch assembly shown in end elevation.

Referring now to the drawings, wherein like parts are designated by the same numerals, in FIGURE 1, the letter A designates a belt conveyor system. This system is of a generally conventional nature, comprising a series of parallel belt elements, of which one is indicated by the numeral 2, moving in the direction indicated, over a table top provided by a series of flat, parallel, spaced table elements disposed in one plane, with the respective belt elements extending over and laterally beyond each of the spaces between table top elements. The belts are perforated at spaced intervals longitudinally thereof, and means (not shown) are provided to apply a negative pressure to the under surfaces of the belts, through the spaces between the table elements, and in selected areas of the top structure. Pulley and idler means such as indicated by the numerals 3, 4 and 5 respectively, provide for alignment and tension of the belts. One or more of the pulleys may be driven by any desired drive means.

Adjacent the input end of the conveyor system and pulley 4, a heat sealing knife 6 is provided for action against a seal roll 7. At this end also, and immediately beyond the knife, vacuum is specifically and intermittently applied to the under surface of the belts, whereby, acting through the belts, the negative pressure positively engages a sealed and cut sheet unit with the belt surfaces, to be carried along therewith.

At the opposite end, the table surface terminates in a series of vertical strip elements, fixed in spaced relation to the pulley 3 and shaped to the conformation thereof. These elements are spaced one from another, over the width of the table, at intervals substantially corresponding to the width of the individual conveyor belt elements 2, and extend downwardly from the level of the belt upper surface to a level below, whereby to provide a defined table edge portion 2a.

An air jet 8, discharging upwardly through the table top between belt elements, is directed against a switch 9, holding the switch open except when the jet is covered by a work unit carried over the jet by the belts 2. The switch 9 is connected in a circuit 10, adapted to energize the clutch assembly in a manner later described.

At a level below the belt conveyor table top, is a second conveyor unit, indicated by the letter B, comprising a series of platen or tray type elements such as representatively illustrated in end elevation, and designated by the numeral 12. The ends of these elements are carried on opposed conveyor chains, in generally conventional fashion, for intermittent motion as shown by the directional arrow. Movement of the conveyor chains is adjusted to bring each tray element in turn, to a position as shown in the drawings, and at timed intervals previously determined by the number of units which are to form a stack thereon. Movement of the tray elements is also timed with relation to the operating speed of the sealer 6 and conveyor belts 2.

A support structure 21 carries a single revolution clutch assembly 31, supported on said structure by means of radial bracket arms 41 and 42, in spaced relation above the respective conveyors, and immediately beyond the belt conveyor, in the direction of travel thereof. A motor 22 also is carried on the support structure 21 by means of an adjustable tilt frame mount 23 pivoted on the support structure 21 as at 24. An adjusting screw means 25, operating between the structure 21 and the frame 23, is provided for positioning of the frame and motor whereby, to adjust tension in the belt drive 26 between the motor and the single revolution clutch assembly 31.

As may be seen in FIGURE 1, there is provided a crank plate 32, including an eccentrically mounted crank pin 33. An annular brake plate 34 is operatively engaged with the crank plate 32. These parts are shown in more specific detail in FIGURES 2A and 2B.

Attached to the crank plate pin 33 for pivotal movement thereon is a crank arm 35. From the crank arm depends a stacker foot 36.

As shown, the stacker foot 36 is a tubular frame member having a rectangular lower portion 36a, an A-frame hanger 37 wherein the lower ends of the frame legs are attached, as by welding or brazing, to the lower portion 36a midway of the ends thereof, and at the upper ends are coupled to the crank arm 35. Stay members as indicated by the numeral 36b are attached at their ends to the lower portion 36a and to the hanger 37 respectively.

The stacker foot 36 is stabilized against free swinging, pivotal action of the crank arm 35 on the pin 33, by means of stabilizer arms 38 pivotally secured at one end to a midpoint 39 on the ends of lower stacker foot portion 36a, and at the other end on a pair of stub shafts 30 mounted on opposite ends of the support structure 21, substantially as shown. In the apparatus contemplated, a pair of such arms is provided, the respective elements of the pair being attached, in the manner shown, at opposite ends of the stacker foot portion 36a.

When mounted and stabilized in this fashion rotation of the crank plate in the direction indicated by an arrow in FIGURE 1, and from the position shown, not only lifts the foot 36, but imparts a slight tilting action centered on the pivot point at 39, elevating the forward longitudinal edge of the foot above the pivot point 39 as the foot is moved upwardly, and depressing the forward edge as the foot is moved downwardly toward the position shown. In FIGURE 1, the foot is shown in its apogeal position relative to the conveyor B. Intermediate positions of the foot as it is moved by the crank pin 33, and as the latter moves between perigeal and apogeal positions relative to the surface of the second conveyor B, are shown in the FIGURE 1 by dashed lines, illustrating the second phase of the tilting action described.

Figure 2A:
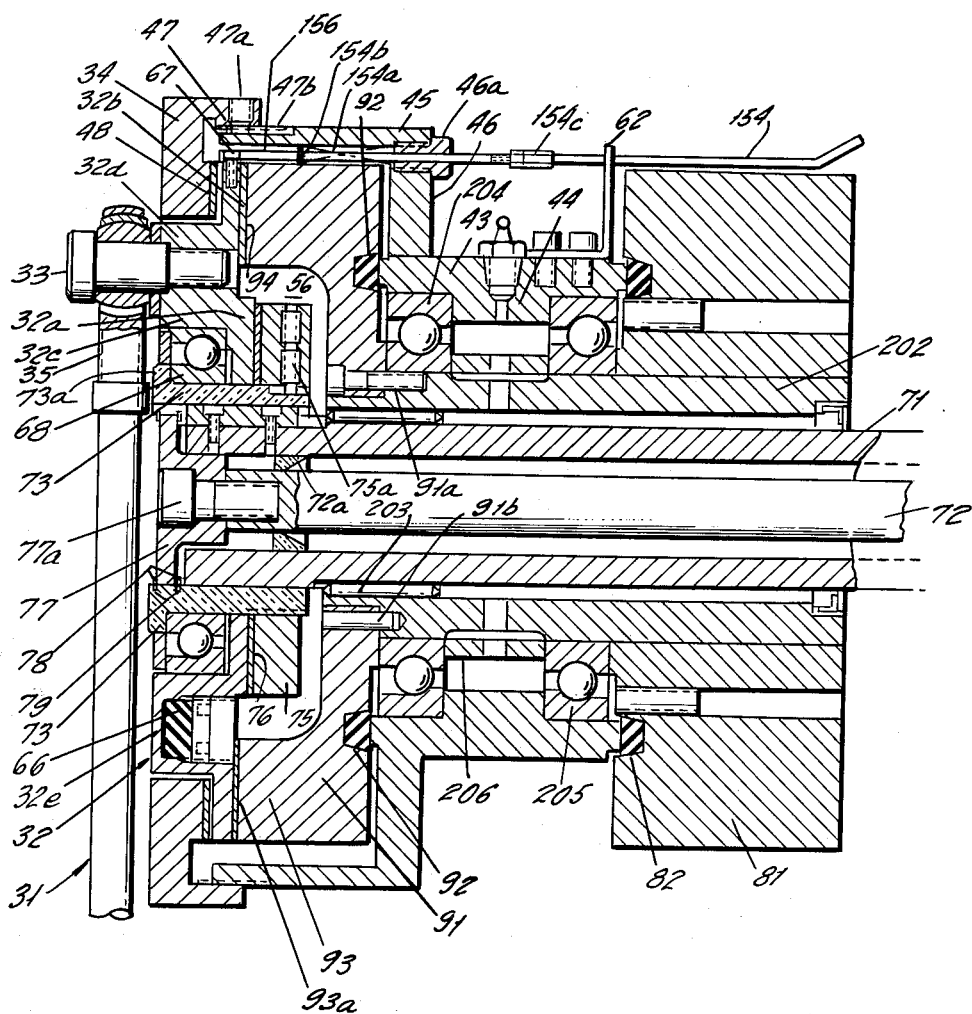

In FIGURES 2A and 2B, the structure of the clutch assembly, designated by the numeral 31, is more specifically illustrated. In the assembly shown, the numeral 43 designates a hollow cylindrical support collar from which the diametrically opposed radial bracket arms 41 and 42, designated in FIGURE 1, extend into engagement with the support frame structure. Internally, the collar 43 is formed to provide an annular flange 44 midway between the edges of the collar 43.

At the outer end of this collar, adjoining the plate 34, a casing member is secured to the outer surface of the collar, and in spaced relation to the collar end. This casing member comprises a hollow cylindrical portion 45 having an inwardly extending annular flange 46 adapted to fit over the collar 43, to be secured thereto as shown and described.

The casing cylindrical portion 45 is adapted for telescopic threaded association with rim 47 of the annular brake plate 34, this association being maintained between the plate 34, as by set screw 47a. Between the plate 34, the flange 46, and portion 45 there is formed a chamber 56 opening outwardly through the center of the plate 34.

A second support for the assembly is provided by means of a cross bar member 61 disposed in axially spaced relation to the inner end of the collar 43, at substantially right angles to the collar axis, and with the lower longitudinal edge of the cross bar adapted to be supported on and secured to the main support frame structure. The outer face of the bar provides direct support for a sub-assembly housing later described, while the inner face provides support for a shaft housing 71, and thereby supplementary support for other elements, including a flywheel 81, clutch plate 91, and the crank plate 32. The inner face of cross bar 61 also provides support for a bracket 62 mounted thereon. The shaft housing and supplementary support 71 extends from the inner face of the cross bar 61, to which it is bolted as shown, through and beyond the collar 43 and the chamber 56, its outer end terminating in spaced relation to the outer face of the crank plate 32, and brake plate 34, concentrically therewith.

Internally of the housing 71 a shaft 72 is supported adjacent its outer end by means of an annular shaft guide 72a, the outer end of the shaft terminating in spaced relation to the outer end of the housing. The inner end of the shaft extends through a passageway 63 in the cross bar 61 and through an aligned passageway in one wall of a two part cylinder head 102, forming a part of the sub-assembly housing. Within this cylinder head 102 the shaft 72 terminates in a circular two part head plate 103 secured to the shaft end. The head plate 103 is adapted to receive and retain the inner edge portion of an annular diaphragm 104, the outer edges thereof being received and retained between the opposed edges of the two parts of the cylinder head 102, whereby to divide the chamber within the head into two alternately functioning pressure chambers 102a and 102b. By means of the diaphragm and head plate arrangement alternating pressure in the chambers 102a and 102b imparts reciprocal movement to the shaft and other parts directly related thereto. An O-ring on the shaft, where it passes through the wall of cylinder head 102, seals against loss of pressure, while a keyway 72b in the shaft and a guide pin 61a in the cross bar support 61 cooperate to prevent rotational movement of the shaft and the diaphragm head assembly.

In addition to crank plate 32, the brake plate 34, the shaft 72, and the components contained in the sub-assembly housing the principal operating elements comprise the flywheel 81, flywheel extension 202, clutch plate 91 and the various related parts associated with these. Of these elements, the flywheel 81 and its extension part 202 are joined as an integral unit.

The flywheel 81 is an annular plate member of relatively great mass, preferably being a casting of iron. The extension 202 is a sleeve member integrally joined to the flywheel as by welding, and in concentric relation thereto. The sleeve and flywheel are adapted for disposition in coaxial, rotationally supported relation to the housing 71, the sleeve extending through the collar 43 into the clutch chamber 56.

The end of the sleeve within the chamber 56, is shouldered, as at 202a, to provide a shoulder face adapted to receive the inner face of the annular clutch plate 91 butted against it, and secured thereto by means such as the cap screws 91a and dowels 91b. As thus assembled, the mass of the composite flywheel, sleeve, and clutch plate is considerable relative to the mass of the crank plate.

This unit is further supported for rotation in the assembly by means of annular ball bearing components 204 and 205 disposed on opposite sides of the collar shoulder 44 and respectively retained between the shoulder and the inner face of clutch plate 91, and the shoulder and the inner face of the flywheel 81. A spacer sleeve 206, slideably fitted on the flywheel sleeve between the bearing components cooperates with the shoulder 44 and the flywheel and clutch plate as a bearing retainer member.

In this combination of elements, the bearings 204 and 205 are recessed in the ends of the collar 43, with the clutch plate and flywheel shaped to extend into the recess. Also, the clutch plate and flywheel are provided with opposed annular recesses, 92 and 82 respectively, adapted to receive felt type seals for sealing contact with the collar ends.

The outer face of the clutch plate 91 is dished, forming a thickened annular rim portion indicated by the numeral 93, and exposing an annular surface portion 93a faced in the direction of the inner brake plate surface and parallel thereto. Each of these surfaces is adapted to receive a layer of a material having high frictional characteristics, such as a moulded brake lining material indicated by the numerals 94 and 48 respectively. This material may be bonded or otherwise secured to the respective surfaces.

Mounted on the outer end of the housing and support member 71, and adapted to extend beyond it, is a thrust ring 73, having a radial flange 73a at its outer end. This ring is keyed, as by key 74 to the housing 71 for reciprocally slideable motion longitudinally of the housing end. On the inner end of the ring is mounted an annular auxiliary braking plate 75, secured to the ring as by a dog toothed set screw 75a substantially as shown. The outer surface of this plate is also faced with a friction brake material, as indicated by the numeral 76.

Reciprocal motion is imparted to the ring 73 and thereby to the plate 75 by means of the shaft 72, acting through a thrust plate 77 mounted on the end of the shaft as by means of a cap screw 77a. The plate 77 is engaged with the ring 73, internally thereof, as by means of snap rings 78 engaged in annular receiving recesses 79.

The annular crank plate 32 comprises a center portion 32a and an outer rim portion 32b with an upstanding annular ridge portion 32c intermediate the outer edge of the rim portion and the inner edge of the center portion, said ridge substantially defining the area of said rim and center portions. As shown in FIGURE 1, the ridge portion 32c is buttressed on the outer surface of the rim portion 32b to a radial distance from the axis of the plate substantially equal to the radius of the inner periphery of the annular brake plate 34. The crank pin 33 is mounted in a boss 32d disposed in this buttressed area of the rim portion 32b substantially in the manner shown in FIGURE 2A.

Also, as indicated in FIGURES 1, 2A, and 2B, a second boss 32e is provided in diametrically opposed relation to the boss 32d. This boss is hollow, and is adapted to receive counterweighting means, such as indicated by the numeral 66 in FIGURE 2A, whereby to balance the crank pin 33, as well as a cam plate 67 mounted circumferentially of the crank plate, and preferably in a position thirty to forty degrees ahead of the crank pin 33.

The central opening provided by the annular plate 32 is adapted to fit over the outer diameter of the thrust ring 73 in radially spaced relation thereto. The plate is supported on the ring for rotation thereon by means of an annular ball thrust bearing 68, being loosely retained between the bearing and the brake lining material 76 on the face of the auxiliary brake plate 75. Preferably, clearances between the crank plate surfaces and the adjoining surfaces of the brake plates and clutch plates are established so as to require not more than about fifteen thousandths of an inch travel distance to move the crank plate into operating contact with one or the other of these surfaces. Within limits of between about ten thousandths and about twenty thousandths, the position of the brake plate 34 may be changed relative to the crank plate 32. This is accomplished by threading and unthreading the plate 47 on the housing part 45. Provision is made for setting and locking the plate at intervals as by means of the set screw 47a and corresponding locator slots 47b spaced circumferentially of the threaded area of the housing surface.

Returning now to the means for actuating the crank plate to make contact thereof alternately and sequentially with the clutch and brake plates, reference is made again to the sub-assembly housing.

As shown in FIGURES 2A, 2B, 3 and 4, the upper part of this housing includes a center block portion 111, block extension portions 112 and 113, respectively, and cover block portions 114 and 115 respectively. When assembled in the manner shown, these block portions cooperate to define a series of communicable passageways, valve, piston, exhaust and pressure chambers essential to application of fluid pressure in alternating sequence to opposite sides of the diaphragm head, including plates 103 and diaphragm 104.

The center block 111 provides two parallel chambered portions 116 and 117 respectively in the outer side aspects of the block. This block also provides a pair of separate chambered portions 118 and 119, each opening laterally into the chambered portions 116 and 117, by way of passageways opening through the inner walls of these portions, and generally designated by the numerals 116a, 117a, 116b and 117b. Of these, the portion 118 is an exhaust chamber, while the portion 119 is a pressure chamber. The pressure chamber is provided for communication with a source of a pressurized fluid, such as an air compressor (not shown), by way of an inlet 119a and a reservoir chamber 119b. In turn, the exhaust chamber opens to the atmosphere by way of the passageway 118a shown in FIGURE 3.

The enclosure of chambered portions 116 and 117 of the block portion 111 is completed by means of the block extension portions 112 and 113 respectively. Each of these extension portions defines a series of chambered portions designated in the drawings by the numerals 112a and 112b, and 113a and 113b. Of these, all are evident in FIGURE 3, while only the portions 112b and 113b are to be seen in FIGURE 2B. As particularly evident from FIGURE 3, the chambered portions 112a and 113a are axially aligned respectively with the passageways 116a and 117a, and with each other, at one end of the blocks 112 and 113, while the portions 112b and 113b are axially aligned with the passageways 116b and 117b, respectively and with each other at the opposite ends of the blocks. The outer end of each of these chambered portions opens through the outer side of the respective blocks 112 and 113 to be closed in turn by the cover blocks 114 and 115 respectivley. The inner ends open by way of annularly flanged passageways 112c and 112d, and 113c and 113d into the respective chambered portions 116 and 117. In addition, intermediate the portions 112a and b, and 113a and b, the extension blocks 112 and 113 respectively define recessed portions 120 and 121 having annular bottom wall portions 120a and 121a respectively opening through the inner wall surfaces of the respective blocks and providing outwardly facing shouldered portions 120b and 121b.

The chambered portions 112a and 113a each is adapted to receive a spool valve piston element. This element as shown in the portion 112a, includes a hollow body portion 122 having a flared inner end 124 adapted to seat on the center web formed in the block 111 between the chambered portions 116 and 117, and containing the chambered portions 118 and 119. An O-ring seal 124a provides a fluid tight seating seal. A hollow shaft extension 126, concentric with the body, is adapted to extend through the passage 116a into the chambered portion 118. The length of this shaft extension is determined by the depth of the chambered portions 116 and 117 plus about one half of the value clearance, when open, allowed by the depth of the chambered portions 112a and 113a. At the other end of the body portion 122, and freely disposed within the chambered portion 112a, is a piston head element 123 having an annularly grooved edge portion adapted to receive an O-ring seal 123a. Although the head element is freely disposed in the chambered portion, it is maintained in constant contact with the outer end of the valve body under pressure applied to its outer surface, and by pressure of the body portion against its inner surface.

As noted above the valve described with reference to its location in the chambered portion 112a has a mirror image counterpart in the chambered portion 113a. The hollow shaft portions of these values are united in coaxial relation by means of a bolt and nut indicated and designated by the numeral 125.

At the other end of the extension blocks 112 and 113, the chambered portions 112b and 113b are adapted to receive piston head elements 126 and 127 respectively, connected by means of a shaft 128. The shaft 128 has a length adapted to permit movement of each piston head substantially from end to end of the respective containing chambered portions. A retainer plate 128a and an O-ring seal 128b in each of the chambered portions 112b and 113b provide shaft seals between these portions and the respective chambered portions 116 and 117. Each of the portions 112b and 113b is vented to the atmosphere at the inner ends, adjacent the shaft seals by a passageway such as indicated by the numerals 130 and 131 in FIGURE 2B, and at their outer ends by passageways 130a and 131a respectively. These latter vents are in continuous communication with the passages 120 and 121.

Mounted on the shaft 128 is a tubular spool valve member 132. At each end, the valve 132 is provided with an annular recess, and an O-ring seal member, as respectively designated by the numerals 132a, and 132b. Connection between the value and shaft is established through the medium of a spider 133 internally of the valve, and diametrically thereof, intermediate the ends.

The spool valve 132 is supported for reciprocal movement with the shaft by means of a sleeve bearing 134 disposed so as to extend through and beyond the passageways 116b and 117b into the respective chambered portions 116 and 117. Snap rings 136 and 137 retain this sleeve in fixed relation in the passageways. O-rings 136a and 137a seal the sleeve bearing in relation to the walls of the passageways 116b and 117b, while O-rings 136b and 137b establish a seal between the spool valve and the sleeve bearing therefor.

The sleeve bearing defines a series of apertures 134a, spaced peripherally of the sleeve, adapted to communicate with the chamber 119. A corresponding series of apertures 138 defined in the spool valve 132, extending longitudinally from the spider 133, provide for communication between the interior of the spool valve and the chamber 119, by way of the apertures 134a in the sleeve 134.

Figure 3:
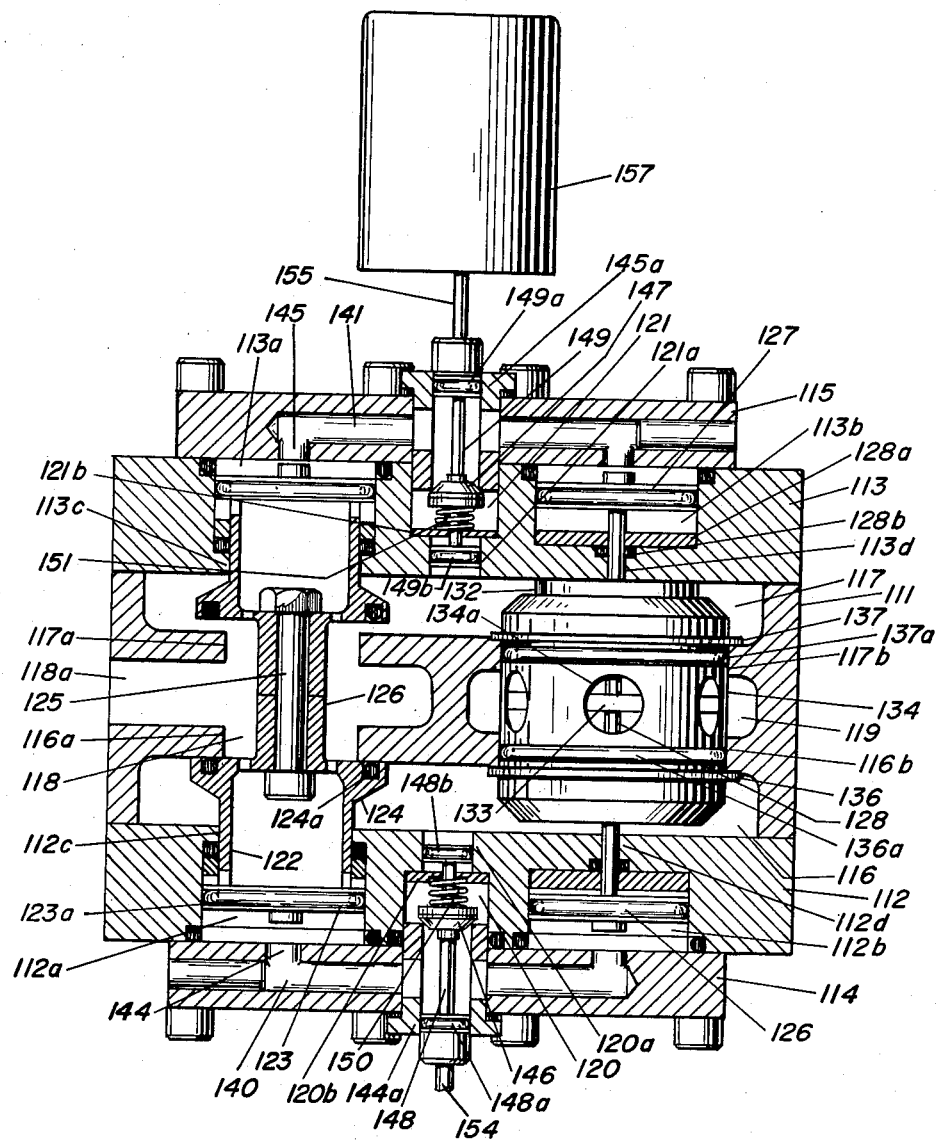
FIGURE 3 is a horizontal section taken along the line III—III of FIGURE 5, with parts in elevation.
Figure 4:
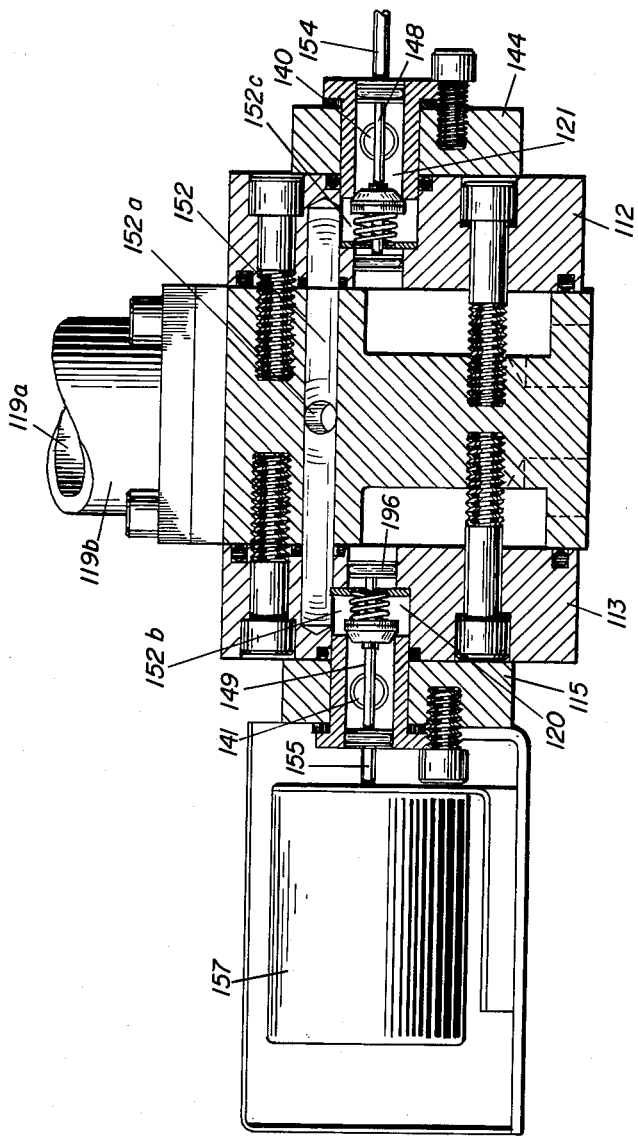
FIGURE 4 is a vertical section taken along the line IV—IV of FGURE 5, with parts shown in elevation.
Figure 5:
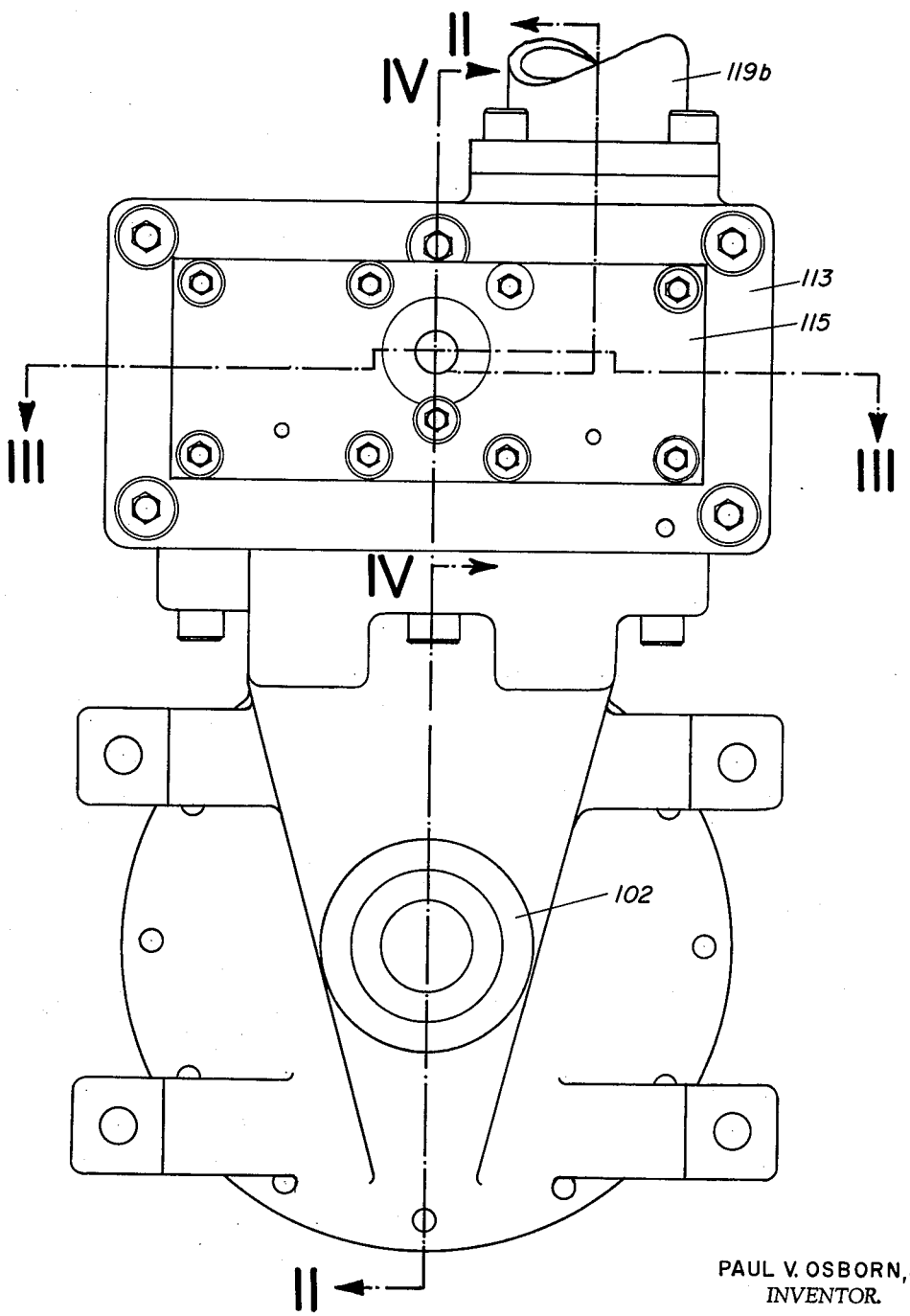
FIGURE 5 is an elevation showing where the sections II—II, III—III, and IV—IV are taken.

The chambered portions 120 and 121, previously referred to, are particularly shown in FIGURES 3 and 4. As shown, these portions open inwardly into communication with the chambered portions 116 and 117 respectively. They also open outwardly into communication with passageways 140 and 141 respectively, defined longitudinally of the cover block 114 and 115, by way of passageways 144 and 145 opening through the blocks 114 and 115 in right angular relation to the passageways 140 and 141, and perforate sleeve members 144a and 145a extended through passageways 140 and 141 into the portions 120 and 121 respectively.

The inner ends of the sleeves 144a and 145a respectively provide seating surfaces for tappet valve elements 146 and 147 mounted on shafts 148 and 149 respectively. At each end, each shaft also carries a disc seal element. These elements are designated in the drawings by the numerals 148a and 148b, and 149a and 149b. The elements 148a and 149a are adapted for sealing relation in the sleeve elements 144a and 145a respectively, while the elements 148b and 149b are adapted for such relationship in the passageways provided by the annular shouldered portions 120a and 121a respectively. Expansion springs 150 and 151, respectively engaged between valve elements 146 and 147, and retainer plates 120b and 121b, normally maintain these valves in a closed position, aided by the pressure transmitted to the chambered portions 120 and 121 by way of a passageway 152 defined transversely of the center block portion 111 and extended by corresponding, aligned definition in the extension blocks 112 and 113. The passageway 152 communicates with the pressure chamber 119 by way of a branch 152a, and with the chambers 120 and 121 by way of branches 152b and 152c.

The valves 146 and 147 are actuated by means of tappets 154 and 155. Of these, the tappet 154 is an elongated rod member extending, as particularly shown in FIGURE 2A, from close juxtaposition to the end of tappet valve shaft 149 and sealing disc 149b, through guide bracket 62, plug guide 46a in flange 46, and through the chamber 56, intermediate the inner surface of the casing member portion 45 and the outer periphery of the clutch plate 91. A guide block 156 supports the outer end of the rod 154. An expansion spring 154a, engaged between a snap ring 154b and the plug 46a, maintains the rod 154 in an extended position. In this position the inner end is slightly spaced from the tappet valve shaft 148 and seal 148a and 148b, and the inner end in position to intercept the travel path of the cam 67. A collar coupling 154c provides means for adjusting the spaced relationship of the inner end of the rod to the shaft and seal 148a and 148b.

The tappet 155 is an extension of the core of a solenoid 157, adjustably supported on a bracket 159 on the cover block 115, so as to maintain the outer end of the tappet in closely spaced relation to the outer end of the valve shaft and seal elements 149a and 149b. The solenoid is actuated to press the tappet 155 against the seal elements 149a and 149b through the electrical circuit connection 10, with the air switch 9, indicated in FIGURE 1.

In operation, the operating cycle would start with the crank pin 33 in its apogeal position, as shown in FIGURE 2A. In this position, the cam 67 would have contacted the tappet 154 to engage it with the valve shaft 148 whereby to move the valve 146 from its seat against the sleeve 144a, momentarily placing the passageway 120 in communication with the passageway 140 as shown in FIGURE 3. The pressure existing in the passageway 120, by reason of its constant communication with the pressure source through passageways 152b, 152, and 152a, chamber 119, inlet 119a, and reservoir 119b, is thus applied, through the passageway 140 and passageway 144, against the heads 123 and 126. Under the pressure thus momentarily applied to the heads 123 and 126, the piston 122 and the shaft 128 are moved to the positions shown in FIGURES 2B and 3. In this position the piston 122 seals the chamber 116 from the exhaust chamber 118, and by reason of the integral relationship between the corresponding piston elements in the chambers 112a and 113a the opposed piston element is moved in the chamber 113a to open the chamber 117 into communication with exhaust chamber 118.

At the same time, movement of the piston 126 and shaft 128 causes spool valve 132 to move into sealing relation with the outer wall of the chambered portion 117 formed by the extension block 113 to the position illustrated in FIGURES 2B and 3. In this position, communication is established between the pressure supply source and the cylinder head chamber portion 102b, by way of the reservoir chamber 119b, passageway 119, apertures 134a in the sleeve bearing 134, apertures 138 in spool valve 132, the chambered portion 117, and the passageway 160a in cross-over block 160.

In FIGURES 2A and 2B, the rod 72, the connected head plates 103 and the diaphragm 104 are shown in the position assumed immediately prior to activation of the tappet 154 by the cam 67. Now, with pressure applied to the head chamber portion 102b, the head plates 103 and diaphragm 104 will be moved to force the rod outwardly from the chamber and, through the thrust plate 77 and thrust ring 73, to move the crank plate 32 from contact with the clutch plate 91 into contact with the braking surfaces provided by the brake plates 34 and 75.

As noted previously, the cam member 67 is positioned on the crank plate rim so as to contact the rod 154 at a point slightly in advance of apogeal position of the crank pin 33. The position of the cam is determined by the time required for the full outward stroke of rod 72 to engage the crank plate in braking relation to the braking surfaces of plates 34 and 75. Also, as noted previously, at operating speeds up to about 600 revolutions per minute, the cam setting may be between 30 and 40 circular degrees ahead of the crank pin 33.

The crank plate 32 is held in braked relation to the brake plates 34 and 75 during the time that pressure is maintained in the chamber portion 102b. This pressure is maintained until the valve 147 and shaft 149 are actuated by the solenoid shaft 155. Such actuation results as the passage of a sheeted element or bag interrupts the air stream directed against the switch 9 by the jet 8.

When the air stream is thus interrupted, the switch closes to energize the solenoid 157. The solenoid shaft 155 then contacts the valve shaft 149, and momentarily admits pressure to the passageway 141, and thence through the branches, such as designated by the numeral 145, to be applied against the piston head element corresponding and opposed to the head element 123, and to the piston element 127. Under this pressure, the piston unit, representatively designated by the numeral 122 is moved to seal the passageway 117 from the exhaust chamber 118, while the passageway 116 is simultaneously opened thereto. Simultaneously, the valve 132 is moved by the piston 127 and shaft 128 to engage the valve against the outer wall of the chambered portion 116 formed by the extension block 112. Now the chambered portion 116 will be in communication with the exhaust chamber 118, while the chambered portion 117, will be in communication with the chambered portion 119 in the manner previously described with reference to the initially described phase of the operation cycle.

In this phase of the cycle, pressure is transmitted to the head chamber portion 102a. The pressure thus transmitted moves the plates 103 and diaphragm 104 from the position shown in FIGURE 2B. By this movement, the shaft 72 is drawn into the cylinder head 102. By such movement, the crank plate 32 is disengaged from the brake plate 34 and engaged with the clutch plate 91 continuously rotated through its described connection with the flywheel 81 and the driven connection of the flywheel with motor 22 through the belt 26.

The foregoing operating description of the clutch assembly contemplates its incorporation in a system for stacking individual elements cut from a web or sheet of a material substantially continuously fed through a cutting and/or sealing mechanism as described with reference to the representative heat sealing and cutting mechanisms designated in the drawing FIGURE 1 by the numerals 6 and 7. In this system the sheeted material is fed from a supply source, not shown, cut and/or sealed to form the work units to be dealt with. These units are successively picked up and conveyed by means of the belts 2 while being retained thereon under atmospheric pressure induced by application of suction through perforations in the belts. As the pressure is released at the table edge portion 2a, the work units are projected outwardly over the conveyor 12. As each unit passes over the air jet 8, the switch 9 is actuated to energize the solenoid 157 in the manner previously described. When thus energized, the crank plate 32 is actuated to rotate the crank pin 33 downwardly, and thereby to depress the stacked foot 36 at substantially the instant that the work unit is projected over the conveyor 12, interrupting its path of projected travel, and depositing it on the conveyor 12 substantially at the end of the stroke of the crank arm 35. Of course, suitable adjustments must be made in the mechanical and electrical components in order to synchronize and time the sequential activation of the respective operating components in relation to the longitudinal dimension of the work units produced. This is accomplished by driving means for the respective conveyors, and for the means for feeding sheeted stock material, geared and timed to produce any desired work unit dimension and production rate. Such means are well known from the prior art, and are generally available in commerce. Although thus described and related to a system for the production and stacking of individual units of a sheeted material, the clutch component is not necessarily limited to such utilization. As should be evident, the crank pin 33, or the crank arm 35 could be connected to electrical or other mechanical means whereby to produce intermittent activation or actuation of any sort of mechanism requiring such type of movement for its utilization. Also, by suitable means similar to the solenoid shaft action described, and by employment of additional cams, such as the cam 67, the movement of the crank plate 32 can be initiated and interrupted through substantially any desired sequential series of events.

For example, in a clutch assembly of the character described, wherein the crank plate has an inertial factor of between thirty and forty circular degrees, a cycle time of between sixty and eighty degrees would be possible, rather than the three-hundred-sixty degree cycle employed in the described system. Also, by further reducing the thrust or stroke of the shaft 72, the cycle time of the clutch assembly could be further reduced. In any event, it is considered to be obvious, that the utility of the clutch assembly is not limited to the utilization described for purposes of illustration. Furthermore, it is considered to be obvious that the system, as described, is not specifically limited to employment in the handling of sheeted thermoplastic materials, but is adapted for use in any system for cutting and stacking sheeted materials of any sort.

What is claimed is:

An apparatus for cutting individual elements from a web of a sheeted material, and for stacking said cut elements, comprising a cutter operable in a timed intermittent sequence to separate a predetermined number of said elements from said web in a continuous series; a continuously moveable conveyor belt system adapted to receive said elements as cut from said web, including means to retain said elements in contact with the surface of said belt system during at least a portion of its travel path, said system having a terminal end including a fixed table surface portion, said belt system providing means for projecting said elements carried thereby over said table surface portion in an initial path substantially in the plane of said belt system travel path; a second conveyor system having an upper surface disposed at a level below that of said belt system, moveable in a path of travel parallel to that of said belt system and extending beyond said system fixed table surface, said second conveyor system including means for timed intermittent movement of said conveyor; a web element stacking frame, including foot and head portions; means for suspending said stacking frame by said head portion for generally vertical reciprocal movement in a travel path extending between a level immediately above that of said belt system and beyond the terminal end thereof and the level of said second conveyor system, said suspension means including a crank pin secured at one end to said stacking frame head portion, a rotatably mounted crank plate, said crank pin being secured to said crank plate; means for intermittent rotation of said crank plate, including a continuously rotated clutch plate and a fixed, annular brake plate disposed in coaxially aligned relation to said crank plate on opposite sides thereof; and means for moving said crank plate into alternating engagement with said respective clutch and brake plates in a timed sequence.

(References on following page)

References Cited by the Examiner

UNITED STATES PATENTS

| | | | |
|---|---|---|---|
| 204,907 | 5/78 | Sawyer | 83—91 |
| 1,144,269 | 6/15 | Vickery | 271—88 |
| 1,765,270 | 6/30 | Hensley | 83—91 |
| 1,821,001 | 9/31 | Bower | 271—88 |
| 2,156,030 | 4/39 | Rufus | 74—125.5 |
| 2,234,116 | 3/41 | Grupe | 271—88 |
| 2,277,846 | 3/42 | Couch | 271—88 X |
| 2,514,611 | 7/50 | Smith | 83—91 |
| 2,761,505 | 9/56 | Griener | 83—91 X |
| 2,865,449 | 12/58 | Frankenburg | 83—100 |
| 2,915,906 | 12/59 | Scott | 74—125.5 |
| 2,947,345 | 8/60 | Schjeldahl | 83—171 X |

WILLIAM W. DYER, Jr., *Primary Examiner.*

CARL W. TOMLIN, *Examiner.*